S. G. SMITH.
CAR BRAKES
No. 180,802.  Patented Aug. 8, 1876.
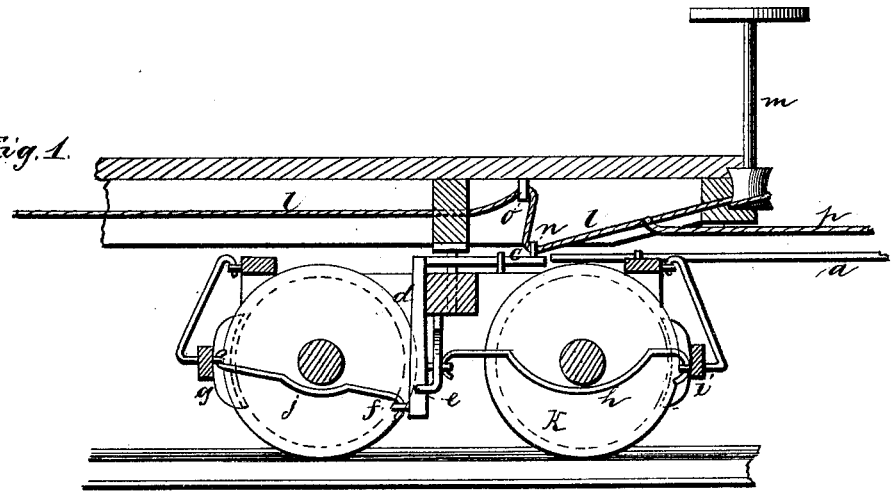
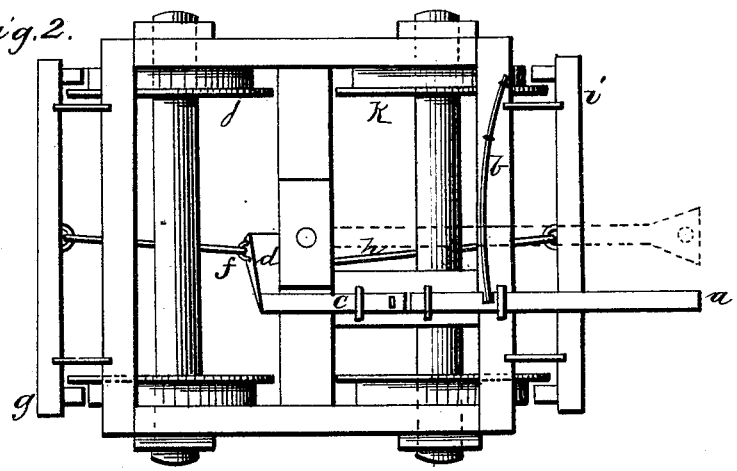
Attest:
Frank H. Jordan
Nathan Wood
Inventor:
Silas G. Smith
per Wm Henry Clifford
atty

UNITED STATES PATENT OFFICE.

SILAS G. SMITH, OF HOLLIS, ASSIGNOR TO SAMUEL W. LUQUES, OF BIDDEFORD, MAINE.

IMPROVEMENT IN CAR-BRAKES.

Specification forming part of Letters Patent No. 180,802, dated August 8, 1876; application filed October 2, 1875.

*To all whom it may concern:*

Be it known that I, SILAS G. SMITH, of Hollis, in the county of York and State of Maine, have invented certain new and useful Improvements in Car-Brakes; and I do hereby declare that the following is a full, clear, and exact description thereof, which will enable others skilled in the art to which it pertains to make and use the same, reference being had to the accompanying drawings, and to the letters of reference marked thereon, which form a part of this specification.

Figure 1 is a side view, in section, showing the operating parts of my invention. Fig. 2 is a top-plan view of a truck with my improvement thereon.

Same letters show like parts.

This invention relates to an improvement in the detail of constructing and operating car-brakes; and consists more particularly in the combination and arrangement of the several parts of the brake and its operating devices, all as will now be more specifically pointed out and explained.

The means by which this operation is accomplished I will first describe.

*a* shows an arm, resting on the top frame of a truck, and passing through proper guides to hold it in the required position. *b* is a spring, which has a tendency to keep the arm *a* pressed outward beyond the truck, and beyond the end of the car-body and platform. Similar arms are placed at both ends of every car, or, in other words, on the forward and rear truck of each car. They are so placed and made that when the cars come together or slack up they will strike together, their ends coming in contact. When this takes place the rear end or inner end of *a* strikes the end of the arm *c*, which is connected with the vertical pivoted lever *d*. The pivot of this lever is shown at *e*. Connected with it, at the bottom, is the rod or link *f*, which operates the shoe or brake *g*. Above the pivot *e* the rod or link *h* is connected with the lever *d*, and also with the shoe *i*.

Now, when the arm *c* is pushed back or inwardly, it is apparent that it will so move the pivoted lever *d* as, by means of the rods *f* and *h*, to draw the two shoes *g* and *i* simultaneously against the wheels *j* and *k*, and thus operate to check the speed of the car. This operation, it will be seen, is accomplished by retarding the speed of the forward car or engine, in order that the arms *a* throughout the train will come in contact at their ends and produce the operation described.

The arm *c* is so connected with the vertical lever *d* that its forward end can be raised up by the chain or line *l*. This chain is operated by the brake *m*. It passes through the loop *n* on the arm *c*, up through the loop *o*, and then runs back under the floor of the car, to connect with a similar cord on the car next behind, and is finally secured at the rear end of the rear car.

When the cord or chain *l* is tightened by the brake *m*, the forward end of the arm *c* is raised up. When this is done, if the various arms *a* strike together in the train by the coming together of the cars, then the rear end of the arm *a* will pass under the forward end of *c*, and, of course, have no effect to apply the shoes *g* and *i* to the wheels. This chain or cord is thus employed when it is not desired to have the friction applied to the wheels of the cars.

When the chain *l* is slackened the arm *c* drops into its place by its own weight; or springs and weights may be used, if desired.

*p* shows a cord or chain, which extends forward to the next car in advance, to be operated in the same way. When the chain *l* is drawn tight in any one car it will affect all those in the rear of it, but not those in advance. Thus, when it is desired to brake up a train, the lines or chains *l* being slack, if the speed of the engine is somewhat retarded the coming together of the cars and the contact of the ends of the arms *a* will operate to check the speed of each car throughout the whole train.

What I claim as my invention, and desire to secure by Letters Patent, is—

1. The combination of the arm *a*, spring *b*, arm *c*, vertical pivoted lever *d*, rods *f h*, and shoes *g i*, as herein described, and for the purposes set forth.

2. The combination of the brake *m*, chain *l*, arm *c*, and pivoted lever *d*, substantially as herein described, and for the purposes set forth.

3. The combination of the chain $l$, operating as herein described, with the cord or chain $p$, to operate the chain simultaneously in a number of cars in the rear of the one where the brake $m$ is applied, as herein set forth.

In testimony that I claim the foregoing as my own I affix my signature in presence of two witnesses.

SILAS GAREY SMITH.

Witnesses:
WM. HENRY CLIFFORD,
FRANK H. JORDAN.